US010349375B2

(12) United States Patent
Marten et al.

(10) Patent No.: US 10,349,375 B2
(45) Date of Patent: Jul. 9, 2019

(54) LOCATION DETERMINATION BASED ON ACCESS POINT EMULATION

(71) Applicants: AT&T INTELLECTUAL PROPERTY I, L.P., Atlanta, GA (US); AT&T Mobility II LLC, Atlanta, GA (US)

(72) Inventors: David Gordon Marten, Sachse, TX (US); Rick McConney, Plano, TX (US); Steven Martin, Plano, TX (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 15/353,516

(22) Filed: Nov. 16, 2016

(65) Prior Publication Data
US 2018/0139718 A1    May 17, 2018

(51) Int. Cl.
H04W 64/00 (2009.01)
H04W 48/10 (2009.01)
H04W 84/12 (2009.01)

(52) U.S. Cl.
CPC .......... *H04W 64/003* (2013.01); *H04W 48/10* (2013.01); *H04W 84/12* (2013.01)

(58) Field of Classification Search
CPC ... H04W 64/00; H04W 64/003; H04W 84/12; H04W 4/02; H04W 16/18; H04W 4/021;
(Continued)

(56) References Cited

U.S. PATENT DOCUMENTS 8,655,371 B2   2/2014 Huang
8,700,060 B2   4/2014 Huang
(Continued)

FOREIGN PATENT DOCUMENTS

EP   2386878 A1   11/2011
WO  2014093255 A2   6/2014
(Continued)

OTHER PUBLICATIONS

Carney, Nick, "Cell Phones, Bus Lines, and Privacy in Côte d'Ivoire," Data-Smart City Solutions, datasmart.ash.harvard.edu, May 16, 2013 Published online at [http://datasmart.ash.harvard.edu/news/article/cell-phones-bus-lines-and-privacyin-cote-divoire-243], retrieved on Aug. 26, 2016, 1 page.
(Continued)

*Primary Examiner* — Liton Miah
(74) *Attorney, Agent, or Firm* — Amin, Turocy & Watson, LLP

(57) ABSTRACT

Determining a location for a non-access point device based on non-access point device emulation of an access point (AP) device is disclosed. A non-AP device can pass itself off as an actual AP device to piggyback of location reporting by user equipment (UE). Where a UE observes an emulated AP, e.g., a non-AP device masquerading as an AP device, the observance of the emulated AP can be reported, along with UE location information captured at the time of the observance, to a network database. The UE location information can be used to determine a location of the emulated AP. The location of the emulated AP can be retrieved from the database in response to a query identifying the emulated AP. This can enable the non-AP device to query its own location as observed by the UE. This can enable other devices to receive the location of the non-AP device.

20 Claims, 10 Drawing Sheets

(58) Field of Classification Search
CPC ..... H04W 4/025; H04W 88/08; H04W 8/005; G01S 5/0242; G01S 5/0252; G01S 5/0036; G01S 5/0284
See application file for complete search history.

(56) References Cited

U.S. PATENT DOCUMENTS

| | | | |
|---|---|---|---|
| 8,805,403 | B2 | 8/2014 | Curticapean et al. |
| 8,914,043 | B2 | 12/2014 | Zelinka |
| 9,119,168 | B2 | 8/2015 | Huang et al. |
| 9,392,407 | B2 | 7/2016 | Brachet et al. |
| 9,398,558 | B2 | 7/2016 | Morgan et al. |
| 9,408,178 | B2 | 8/2016 | Mayor et al. |
| 9,439,240 | B1* | 9/2016 | Shipley ............ H04W 8/20 |
| 9,668,099 | B2* | 5/2017 | Davydov ......... H04W 4/023 |
| 2007/0210961 | A1 | 9/2007 | Romijn |
| 2011/0034179 | A1 | 2/2011 | David et al. |
| 2012/0249373 | A1 | 10/2012 | Bhatia |
| 2013/0021912 | A1* | 1/2013 | Finlow-Bates ......... G01S 5/021 370/241 |
| 2013/0023284 | A1 | 1/2013 | Stanger |
| 2013/0231141 | A1 | 9/2013 | Weinreich et al. |
| 2014/0273877 | A1* | 9/2014 | Corson ............ H04W 24/06 455/67.13 |
| 2014/0307551 | A1* | 10/2014 | Forssell ............ H04W 48/16 370/235 |
| 2015/0131470 | A1* | 5/2015 | Boulton ............ G01S 5/0221 370/252 |
| 2015/0346313 | A1 | 12/2015 | Smith et al. |
| 2016/0119758 | A1 | 4/2016 | Liu et al. |
| 2016/0156720 | A1 | 6/2016 | Bransfield, Jr. |
| 2016/0345286 | A1* | 11/2016 | Jamieson ............ H04B 17/12 |

FOREIGN PATENT DOCUMENTS

| | | |
|---|---|---|
| WO | 2015111783 A1 | 7/2015 |
| WO | 2016085624 A1 | 6/2016 |

OTHER PUBLICATIONS

Vaughan-Nichols, Steven J., "How Google—and everyone else—gets Wi-Fi location data," ZDNet, zdnet.com, Nov. 16, 2011. Published online at [http://www.zdnet.com/article/how-google-and-everyone-else-gets-wi-filocation-data/], retrieved on Aug. 26, 2016, 8 pages.

Mathias, Craig, "Location and Tracking Complete the IoT Circle," Boundless Aerohive Networks, boundlessareohive.com, Aug. 12, 2015. Published online at [http://boundless.aerohive.com/experts/Completing-the-IoT-Vision-Locationand-Tracking.html], retrieved on Aug. 26, 2016, 6 pages.

"Skyhook Precision Location for IoT," IBM, developer.ibm.com, created Jun. 10, 2016, modified Aug. 11, 2016 Published online at [https://developer.ibm.com/recipes/tutorials/skyhook-precision-location-for-iot/], retrieved on Aug. 26, 2016, 7 pages.

Saha, Siddhartha, et al., "Location determination of a mobile device using IEEE 802.11 b access point signals," Wireless Communications and Networking, 2003, WCNC 2003, vol. 3. IEEE, 2003. Published online at [https://www.cse.iitb.ac.in/~varsha/allpapers/wireless/wcnc2003/location-802.11b.pdf], retrieved on Aug. 26, 2016, 6 pages.

Jiang, Pei, et al., "Indoor mobile localization based on wi-fi fingerprint's important access point," International Journal of Distributed Sensor Networks 2015 (2015): 45. Published online at [http://downloads.hindawi.com/journals/ijdsn/2015/429104.pdf], retrieved on Aug. 26, 2016, 9 pages.

* cited by examiner

US 10,349,375 B2

LOCATION DETERMINATION BASED ON ACCESS POINT EMULATION

TECHNICAL FIELD

The disclosed subject matter relates to determining a location of a device. More particularly, the disclosed subject matter relates to determining, via location reporting of a second device, a location of a first device that lacks a conventional location technology.

BACKGROUND

By way of brief background, conventional user equipment (UE) can report a location and can report radio access technologies (RATs) observed by the UE. UE reporting of observed RATs and location information can be employed to determine a location of devices associated with an observed RAT. As an example, a smartphone can observe a Wi-Fi access point (AP), and can report to a radio access network (RAN) device the location of the smartphone, the observed Wi-Fi AP, signal strength, etc. This reporting can occur in the foreground, e.g., via an active application executing on the UE, or in the background, e.g., via an operating system (OS) of the UE, via a physical layer of the UE hardware, etc. As such, locations of APs can be readily determined by UE reporting. However, this conventional determining of an AP location via reporting by a UE is generally predicated on the AP comprising AP components associated with a corresponding RAT. As an example, a Wi-Fi AP generally comprises components that allow a UE to establish a Wi-Fi link to a communications network via the Wi-Fi AP, e.g., a real Wi-Fi radio is generally part of a Wi-Fi AP. These RAT device components can be costly, can age out or become legacy technologies, etc. As such, where devices are proliferating under an internet-of-things environment, it can be undesirable to equip generally low cost or consumable devices with RAT device components, for example, it can be undesirable to include Wi-Fi AP components in a parking meter due to cost, limited use, power consumption, etc.

DETAILED DESCRIPTION

Figure 1:
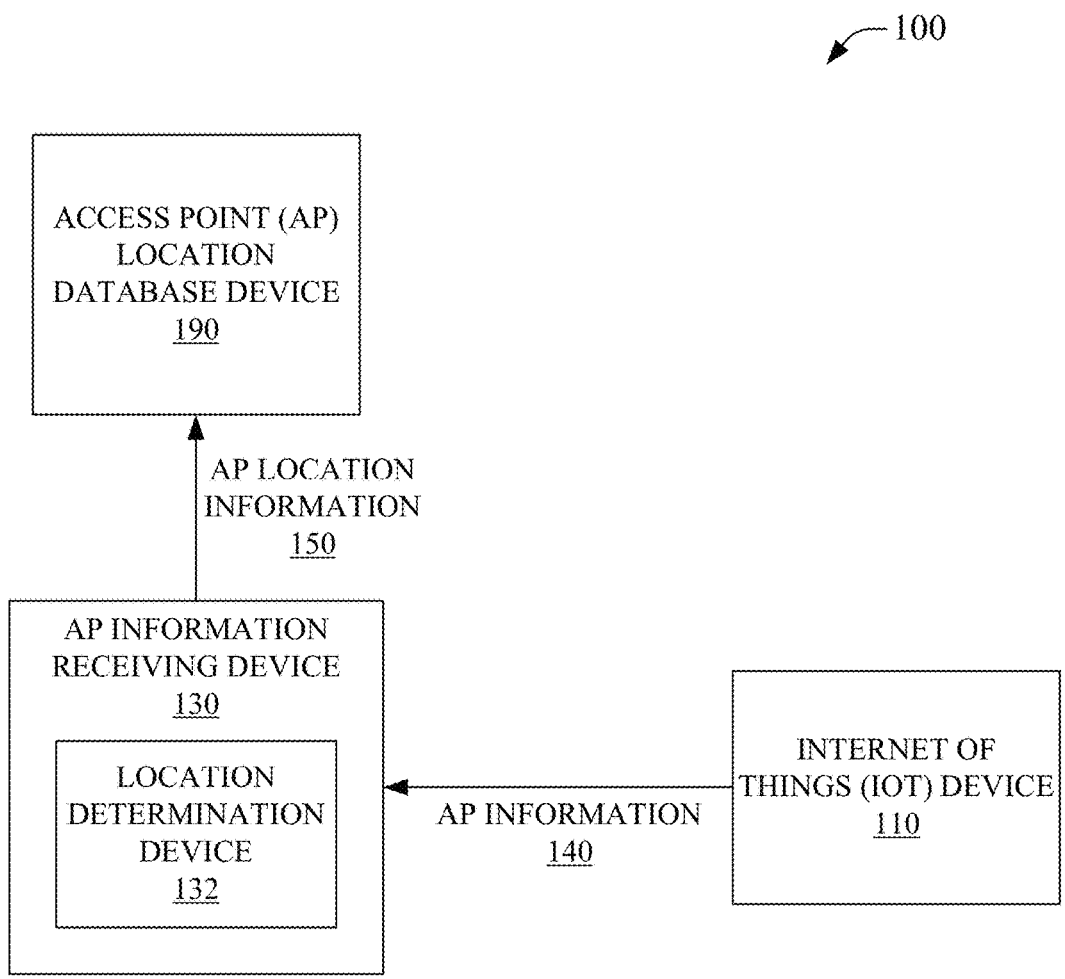
FIG. 1 is an illustration of an example system that facilitates correlating location information of a second device with first device access point information in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional user equipments (UEs) can report a location and can report radio access technologies (RATs) observed by the UE. The reporting observed RATs and UE location information can be correlated to facilitate determine a location of devices associated with an observed RAT. UE reporting can occur in a foreground application executing on the UE, via background executing software, e.g., a backgrounded application or via an operating system (OS) of the UE, or in the background via UE hardware, e.g., at a physical layer, etc. As such, locations of APs can be readily determined by UE reporting. However, conventional APs generally comprise AP components associated with a corresponding RAT, e.g., a Wi-Fi radio, a Bluetooth radio, etc., that can allow a UE to establish a wireless link with said AP. Inclusion of these technologies can be expensive, can cause higher power consumption, can cause a device to be larger, etc. As such, from an internet of things (IOT) perspective, inclusion of these technologies, while affording route to determining a location of an IOT device, can be problematic where the IOT device is often viewed as lower cost, nimble, light weight, and increasingly ubiquitous.

In an aspect, a conventional IOT device can determine a location of said IOT device with conventional techniques, e.g., including global positioning system (GPS) components in the IOT device, including AP-type radio components in the IOT device to allow mapping by UE observation, manually mapping and setting, e.g., by a human, a location for an IOT device, etc. However, these conventional techniques generally come at a cost, e.g., price, size, power consumption, employees, etc. The disclosed subject matter, in an aspect, seeks to leverage the existing reporting of AP identifiers by location enabled receiving devices, e.g., location reporting UEs, etc., to aid in determining a location of an IOT device that typically does not comprise a GPS system, a AP radio system, etc., allowing the IOT device to be smaller, lighter, less costly, less power hungry, etc.

Wireless network systems, conventionally, receive reports from fielded equipment, e.g., UEs, etc., that comprise a UE location and AP information for observed APs. Typically the AP information relates to observed APs proximate to the reported UE location, e.g., if a UE is in the coverage area of a Wi-Fi AP, the UE can report the location of the UE and that it 'sees' the Wi-Fi AP, whereby it can be implied that the Wi-Fi AP is within a distance to the UE corresponding to the coverage area of the Wi-Fi technology. The wireless network provider can correlate locations with APs in a database to allow lookup of the location based on an identifier of the AP. Over time, it is typical that multiple locations can be correlated to the same AP, allowing mathematical manipulation of the data to better determine a likely location of the AP, e.g., averaging locations reported over time for an AP can lead to a better estimation of the actual location of the AP. Inclusion of an AP device in another device can therefore allow determining the location of the other device based on the location of the AP as determined by the UE reporting technique. However, it can be burdensome to include an AP, or equivalent components, in the other device, more especially in devices that are connoted as low-cost, nimble, efficient devices, a perception often attributed to IOT devices.

To overcome the drawbacks associated with conventional UE reporting technology, a device can leverage the existing UE reporting technology by providing emulated AP information, AP information from a partially enabled AP component, etc., hereinafter referred to as 'emulated AP information' or other similar terms unless explicitly described otherwise. Emulated AP information can comprise a unique identifier, e.g., to allow correlation of the emulated AP information with the IOT device in a manner similar to that of AP devices being uniquely identifiable, e.g., via a MAC address, etc.

The emulated AP information can be indistinguishable from conventional AP information employed by UE reporting technologies to determine a location of an AP device. However, in an aspect, the emulated AP information can be unassociated with a working AP, e.g., a UE would be unable to establish a connection via a wireless link assumed to be associated with the emulated AP device transmitting the emulated AP information. Despite being unable to connect to a network via an emulated AP, the UE can otherwise treat the emulated AP information the same as AP information, e.g., reporting it as observed proximate to a location of the UE, typically in the background via hardware, OS, etc. In some embodiments an actual Wi-Fi chip can be employed to 'emulate' a Wi-Fi AP, e.g., rather than an emulator that does not comprise a Wi-Fi chip, such that an IOT device appears to other devices to be a real Wi-Fi AP, however, despite the appearance of being an actual Wi-Fi AP, the Wi-Fi chip, or some other component of the IOT device, can be adapted such that the IOT device isn't actually a Wi-Fi AP. Again, the IOT device just looks like a Wi-Fi AP, so that UEs will log the TOT device to a database in the same/similar manner as any other actual Wi-Fi AP. As an example, a user's phone can see the TOT device and say to the DB, "hey, there's an AP here at my location," but if the user's phone tried to connect to a network, internet, etc., through the TOT device, the connection simply would not work. This allows an TOT designer to use an off the shelf Wi-Fi chip, in lieu of designing an emulator without an off the shelf Wi-Fi chip, but retains advantages observed for an emulator, such as, low power consumption, etc., because the off the shelf Wi-Fi chip is 'partially disabled' and does actually not support data transport via the Wi-Fi protocol.

Analogously, an emulator AP is a little like a fake security camera . . . it looks like a security camera to scare crooks, but it doesn't actually record any video, so as long as the crook believes it's a real camera they'll tell their crook friends that Quicky Mart has a security system in place. Turning to this claim then, rather than using a fake security camera, a real security camera can be used . . . but, the camera cable can be disconnected so that the "real camera" is as ineffective as the fake camera. It's still effective for spreading the work among crooks that Quicky Mart has a security system, but neither the emulator device or the real device actually record security video.

In some embodiments, an IOT device can include, for example, a Wi-Fi AP chipset, to enable broadcasting emulated AP information that can be received and reported by a UE, however, the example Wi-Fi AP chipset can be adapted to be non-functional with regard to effecting a Wi-Fi link to a network, e.g., the chipset can be set to refuse requests for a link, can appear as a private AP, can allow connections to the link but not connect to a network, etc. This can allow a true AP component to be employed as an emulated AP component for the purpose of broadcasting emulated AP information, which can allow UEs to report the emulated AP information and enable determining a location of the AP component included in the IOT device.

In other embodiments, an signal carrying emulated AP information can be generated without using a true AP component associated with a selected RAT, e.g., emulated Wi-Fi AP information can be transmitted without the IOT device comprising a true Wi-Fi AP radio device. As an example, an application specific integrated circuit (ASIC), field programmable gate array (FPGA), etc., can be employed to transmit emulated AP information at a frequency and power associated with a Wi-Fi standard, such that a UE, for all intents and purposes, sees the signal as coming from a Wi-Fi AP, without the IOT device employing a true Wi-Fi chipset to broadcast the emulated AP information. The disclosed subject matter enables piggybacking on conventional UE reporting techniques to allow use of emulated AP information to be used to determine a location of a device, typically without the drawbacks described for inclusion of real and functioning AP components in the device.

In an aspect, UE reporting of observed emulated AP information allows correlation of UE location information to the emulated AP. This correlated information is typically stored in a database in a manner that is indistinguishable from storing UE location information with conventional AP information in the same database. The database can thus be employed to lookup or otherwise receive location information for an AP or an emulated AP, noting that the database would not typically distinguish between the AP and the emulated AP. This can enable a querying device to receive location information for an indicated AP, including an emulated AP, from the database. As an example, an IOT device can request its own location information from the database, another device can request the IOT device location information from the database, network devices can request it, the IOT device location information can be aggregated with other real and emulated AP information, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates correlating location information of a second device with first device access point information in accordance with aspects of the subject disclosure. System 100 can comprise internet of things (IOT) device 110. An IOT device can be an internetworked physical device embedded with electronics, software, sensors, actuators, and network connectivity that can enable the IOT device to collect and exchange data across a network. The IOT device can typically be uniquely identified among what is expected to be tens of millions of IOT devices. IOT device 110 can transmit access point (AP) information 140, which can be emulated AP information.

AP information 140 can be received by AP information receiving device 130. AP information receiving device 140 can be a user equipment (UE). As an example, a vending machine can be an IOT device, e.g., IOT device 110, and can broadcast AP information 140, e.g., emulated AP information comprising a unique identifier for the vending machine, that can be received by AP information receiving device 130, e.g., a smartphone, laptop, tablet computer, vehicle computer, etc. In an aspect, AP information receiving device 110 can transmit emulated AP information, e.g., AP information 140, in accord with a particular radio access technology (RAT), such as a Wi-Fi standard, a Bluetooth standard, etc. Whereas many conventional UE reporting systems employ reporting of Wi-Fi type AP information, emulated AP information can typically be in accord with Wi-Fi standards to enable piggybacking on the conventional Wi-Fi type UE reporting enjoyed by true APs.

In an aspect, AP information receiving device 130 can comprise location determination device 132. Location determination device 132 can determine, estimate, infer, etc., a location of AP information receiving device 130. As an example, a smartphone, e.g., AP information receiving device 130, can comprise a GPS component, e.g., location determination device 132, that can be employed to determine the location of the smartphone. AP information receiving device 130 can report, e.g., as AP location information 150, AP information, including emulated AP information, e.g., 140, and corresponding location information to AP location database device 190.

AP location database device 190 can typically be located remotely from AP information receiving device 130 and/or IOT device 110. In an embodiment, AP location database device 190 can be comprised in a core network associated with a network provider. A core network can be central part of a telecommunications network that provides various services, such as high capacity communication voice and/or data services, to customers who are connected to the core network via an access network, e.g., a radio access network (RAN) device, such as an eNodeB, etc., in a wireless network. In an embodiment, AP location database device 190 can be comprised in a network edge device, such as a RAN device. In an embodiment, AP location database device 190 can be comprised in a cloud environment, virtualization environment, etc., such as on an AMAZON WEB SERVICES device, MICROSOFT AZURE device, a virtualization server of a network provider, a virtualization server of a third party entity, etc.

In an aspect, AP location database device 190 can correlate location information from location determination device 132 with AP information 140 from IOT device 110, as reported by AP information receiving device 130. As an example, an IOT vending machine can transmit emulated Wi-Fi AP information that can be received by a tablet computer in the 'service area' of the IOT vending machine Wi-Fi emulation signal, which AP information, e.g., 140, can be received and reported to AP location database device 190 by the tablet computer along with contemporaneous location information for the tablet computer determined by a GPS component of the tablet computer. In an embodiment, this reporting can occur without user intervention or initiation, e.g., occur in the background of the tablet computing environment, such as by automatic hardware or operating system (OS) reporting of location and 'visible APs' by the table computer, in a manner similar to, or the same as, reporting of a true AP by the tablet computer.

In an embodiment, a plurality of AP information receiving devices can report location information and AP information 140. As an example, where an IOT vending machine is located in a busy area, many passersby can have UEs that receive an emulated AP transmission from the IOT vending machine. Where these UEs have location information and see the IOT vending machine, they can each report to AP location information 150 to an AP location database device 190. The example AP location database device 190 can correlate the several location reports to the unique identifier for the IOT vending machine. The distribution of location information can then be mathematically manipulated or analyzed to associate a location and/or location error with the IOT vending machine identity. In an embodiment, the IOT vending machine identity can be used to look up the associated location, location error, or other location information stored and correlated to the IOT vending machine via AP location database device 190. This can allow, for example, a service technician to rapidly locate the IOT vending machine, based on real world observations made by passing UEs, by requesting the location information for the TOT vending machine from the AP location database device 190, e.g., through a service that queries AP location database device 190. This can similarly free an TOT vending machine provider from needing to map, store, and update TOT vending machine locations without loss of TOT vending machine location access. As another example, cargo storage containers, such as those used for international freight shipments, can be equipped with Wi-Fi AP emulators that can transmit emulated AP information, e.g., AP information 140, which can be reported by passing vehicles comprising AP information receiving devices, e.g., 130, to allow a freight shipping company to track, via queries to AP location database device 190, the location of the cargo storage containers.

Figure 2:
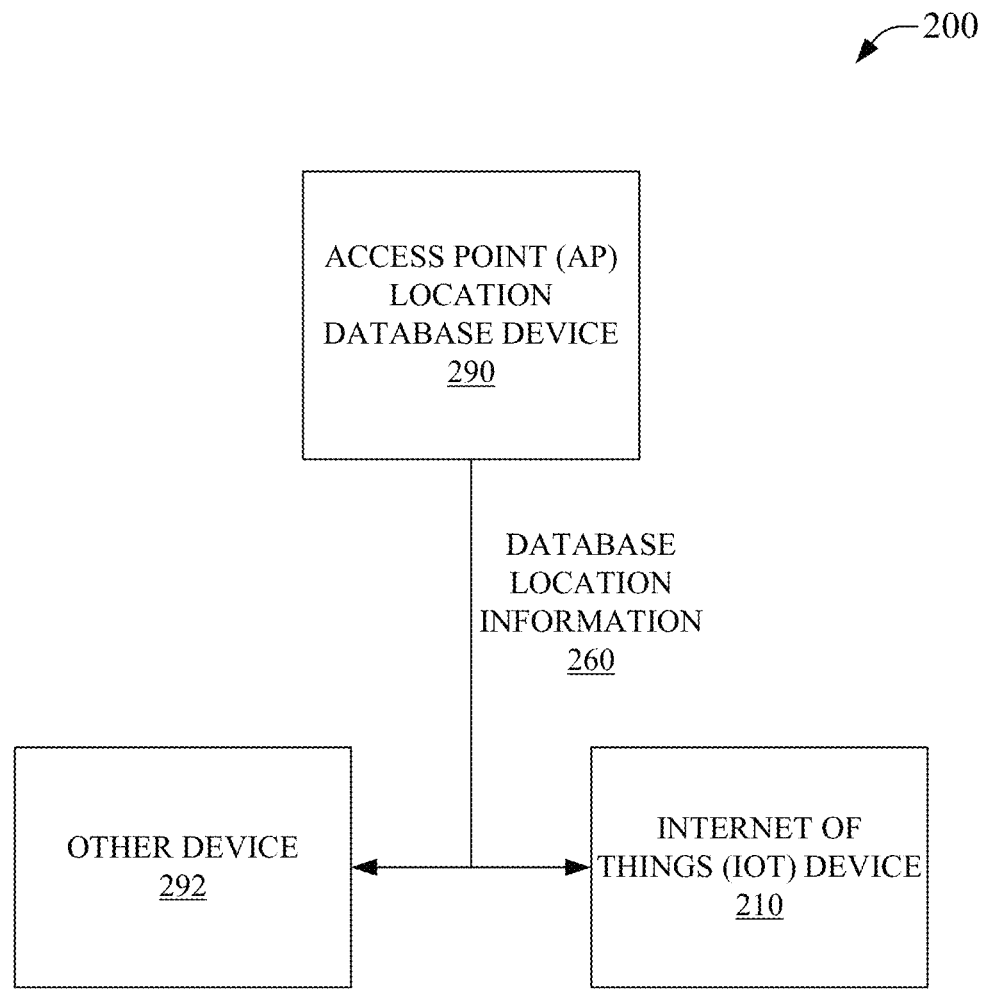
FIG. 2 is a depiction of an example system that facilitates reporting database location information for a first device, wherein the database location information is based on location information of a second device, in accordance with aspects of the subject disclosure.

FIG. 2 is a depiction of a system 200 that can facilitate reporting database location information for a first device, wherein the database location information is based on location information of a second device, in accordance with aspects of the subject disclosure. System 200 can include AP location database device 290. AP location database device 290 can receive and correlate location information and AP information, including emulated AP information. In an aspect, AP information, including emulated AP information, can be received from an IOT device, e.g., IOT device 110, 210, etc., via a location enabled UE, e.g., AP information receiving device 130, etc. AP location database device 290, in some embodiments, can store the raw correlated data, can store aggregated correlated data, can store corresponding correlated data, wherein corresponding correlated data comprises data resulting from an analysis or mathematical manipulation of one or more pieces of raw data, e.g., an average of multiple correlated locations, a Gaussian distribution based on correlated locations, and the like, etc.

In an embodiment, AP location database device 290 can facilitate access to stored data. Access to the stored data can be, for example, in response to a query based on a unique identifier, such as can be included in AP or emulated AP information. Accessed information can be communicated as database location information 260.

Database location information 260 can comprise location information as reported into an AP database by a device, e.g., IOT device 110, 210, etc., via a reporting device, e.g., AP information receiving device 130, etc., or manipulations of location information reported into the AP database, e.g., averages, distributions, calculated errors, etc. based on the reported AP information and UE location. As an example, database location information can comprise the ten most recent raw reported location associated with an IOT device and an average location of the IOT device based on all locations reported for the IOT device in the last three months. Moreover, where different RATs are associated with some of the reported AP information, e.g., some AP information is received by an AP information receiving device via an first Wi-Fi standard and others by a second Wi-Fi standard, e.g., 802.11g and 802.11n respectively, the coverage area for the different Wi-Fi types can be employed to weight the average location reported in the above example. As such, where 802.11g is associated with a generally smaller service area than 802.11n, it can be inferred that an AP information receiving device capturing emulated 802.11g AP information can statistically be more proximate to the transmitting IOT device than a receiving device capturing emulated 802.11n AP information, therefore, 802.11g reports in the last three months can be more heavily weighted than 802.11n reports in an average facilitated by AP location database device 290.

Database location information 260 can be, in an embodiment, received by IOT device 210. Database location information 260 can be received via, for example, a cellular connection, an Ethernet connection, etc. It can be noted that IOT device 210 can comprise a communication device/technology and can similarly comprise an AP information emulator, e.g., a Wi-Fi emulator device, to enable piggybacking on UE location reporting. In an embodiment, database location information 260 can be received by other device 292. Other device 292 can be nearly any device, e.g., a server, another IOT device, a mobile device, a tablet computer, a data aggregation device, a government device, etc. As an example, a unique identifier can comprise, or be associated with, a designation of a type or IOT device, such as all unique identifiers ending in 'parking_meter' are IOT devices related to paid street parking. This designation in the unique identifier can allow a query of the AP location database, via device 290, to return database location information 260 to other device 292, where other device 292 can be, for example, a GOOGLE MAPS server, allowing the mapping of parking meters by location for IOT parking meters transmitting AP information, e.g., emulated AP information. Similarly, database location information 260 can be analyzed to determine a count of reports over time, which can be employed in inferring or determining a density of reporting devices proximate to the IOT parking meters, which can indicate or suggest times when the IOT parking meter is likely in use, e.g., where often occupied IOT parking meter is in downtown, it can be associated with many reports due to a high population density, while in contrast, a rarely occupied IOT parking meter can be in a rural area where it can be associated with correspondingly fewer reports owing to a lower population density. Numerous other analytics can be associated with database location information 260 without departing from the scope of the subject disclosure, though they are not further discussed herein for the sake of clarity and brevity.

Figure 3:
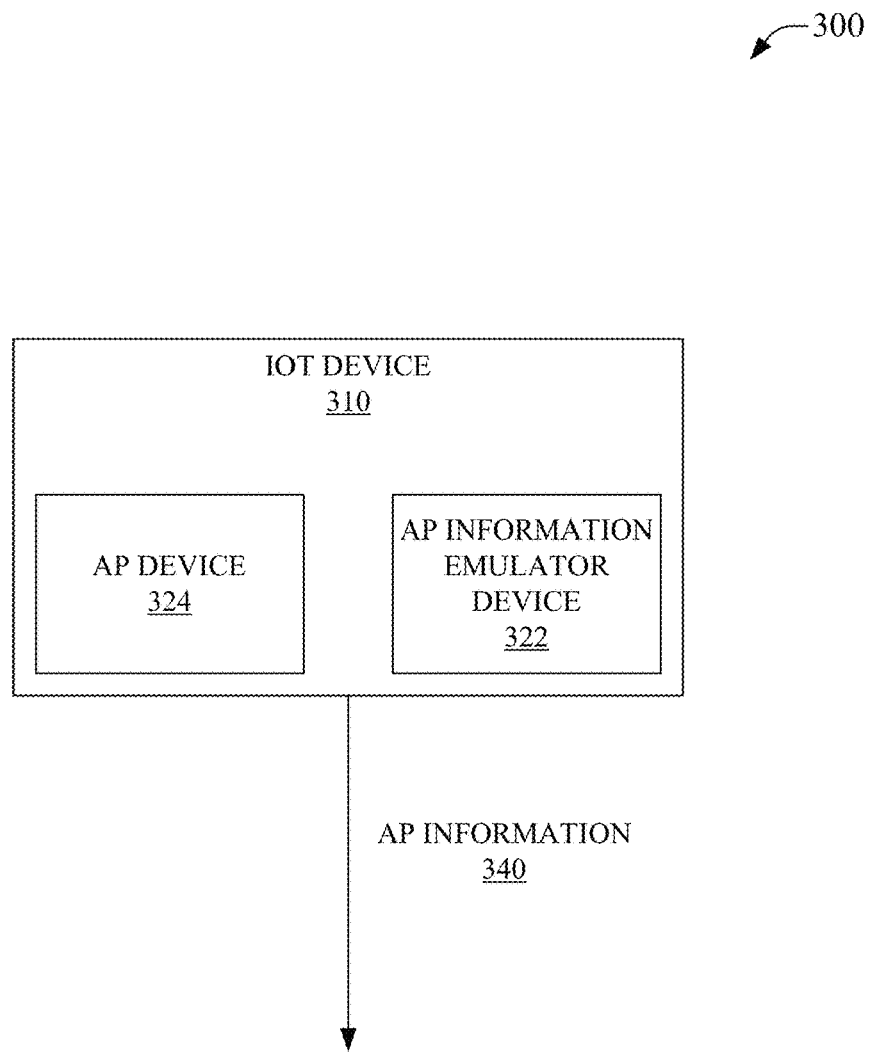
FIG. 3 illustrates an example system that employs an access point information emulator device to facilitate determining location information for a first device based on location information of a second device in accordance with aspects of the subject disclosure.

FIG. 3 illustrates a system 300 that employs an access point information emulator device to facilitate determining location information for a first device based on location information of a second device in accordance with aspects of the subject disclosure. System 300 can include AP information emulator device 322. AP information emulator device can be a device that would not conventionally be considered an AP device but that generates emulated AP information that can be transmitted as AP information 340. As an example, an application specific integrated circuit (ASIC), can be designed to generate an unique identifier at a frequency and format that appears to be a Wi-Fi signal identifying an Wi-Fi AP, even though the ASIC is nonfunctional as a Wi-Fi AP. Similarly, for example, programmable logic controllers (PLCs), field programmable logic arrays (FPGAs), emulator boards comprising hardware/software to emulate certain transmission of a RAT device, etc., can be employed to generate emulate AP information that can be broadcast as AP information 340 without any RAT functionality otherwise.

In an aspect, in quantity, an AP information emulator, e.g., 322, can be less costly, can consume less power, can be smaller, etc., than corresponding AP devices or integrating AP components into the electronics of an IOT device, e.g., 310. As an example, a dedicated AP information emulator board can be mass produced that has a connection for power and that, once powered on, transmits emulated AP information without any other connections. This example emulator board can be rapidly integrated into nearly any IOT device at low cost and with minimal electronics design expertise. Moreover, the example emulator board can consume less power than a true AP board of the same RAT, and typically would not require further programming or interaction. Additionally, the example emulator board can be rapid exchanged should it be damaged without need to reconfigure settings, parameters, etc. Design of the example emulator board is also expected to be much more simple than that of a real AP board because there is typically no expectation of actually connecting any mobile device to the emulator, it is only expected to look like an AP rather than to actually be an AP.

In some embodiments, IOT device 210 can comprise an AP device 324. AP device can be a true AP device, e.g., a device capable of supporting a wireless link with a UE for communication to a network, e.g., a real Wi-Fi board or chipset, etc. In an aspect, this AP device can be modified to prevent any actual connection of a UE to a network via AP device 324. In some circumstances, a real AP device, e.g., AP device 324, can meet design parameters, e.g., low cost, small footprint, etc., such as legacy AP devices, damaged AP devices, etc., allowing AP device 324 to generate AP information 340 for transmission by IOT device 310. Modification of an otherwise functioning AP device, e.g., 324, can include disabling connections to an network, setting a password to restrict actual access to the wireless AP, etc. In general, any modification to AP device 324 that prevents the device from acting as a conventional AP device while still allowing AP information 340 to be transmitted, enabling UE reporting, is within the scope of the instant disclosure and is distinct from conventional UE reporting for determining a location of an AP.

Figure 4:
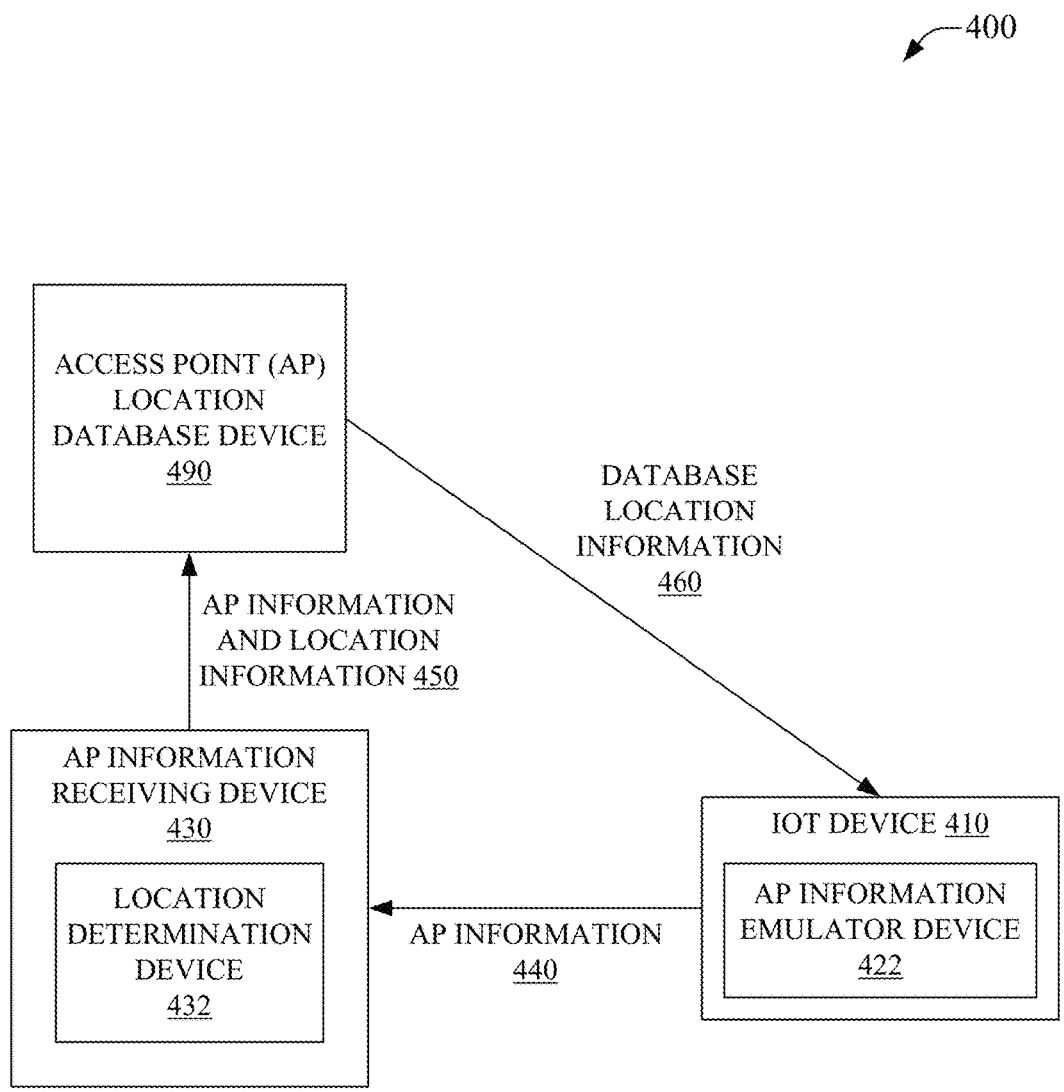
FIG. 4 illustrates an example system that facilitates reporting database location information from a database to a first device based on access point information from the first device and location information of a second device that is correlated to the access point information via the database in accordance with aspects of the subject disclosure.

FIG. 4 illustrates a system 400 that facilitates reporting database location information from a database to a first device based on access point information from the first device and location information of a second device that is correlated to the access point information via the database in accordance with aspects of the subject disclosure. System 400 can comprise IOT device 410. IOT device 410 can comprise AP information emulator device 422. AP information emulator device can generate emulated AP information than can be transmitted to AP information receiving device 430 as AP information 440. In an embodiment, emulated AP information can be indistinguishable from true AP information. Emulated AP information can comprise a unique identifier allowing IOT device 410 to be uniquely identified among a plurality of other IOT devices.

AP information 440 can be received by AP information receiving device 430. AP information receiving device 440 can be a UE. As an example, a briefcase can be an IOT device, e.g., IOT device 410, and can broadcast AP information 440, e.g., emulated AP information comprising a unique identifier for the briefcase, that can be received by AP information receiving device 430, e.g., a smartphone, laptop, tablet computer, vehicle computer, etc. In an aspect, AP information receiving device 430 can transmit AP information 440, e.g., emulated AP information, in accord with a particular RAT, such as a Wi-Fi standard, enabling IOT device 410 to be reported to AP location database device 490 by piggybacking on conventional Wi-Fi type UE reporting enjoyed by true APs.

In an aspect, AP information receiving device 430 can comprise location determination device 432. Location determination device 432 can determine, estimate, infer, etc., a location of AP information receiving device 430. As an example, a smartphone, e.g., AP information receiving device 430, can comprise a cell tower triangulation component, e.g., location determination device 432, that can be employed to determine the location of the smartphone. AP information receiving device 430 can report, e.g., as AP location information 450, AP information, including emulated AP information, e.g., 440, and corresponding location information to AP location database device 490.

AP location database device 490 can typically be located remotely from AP information receiving device 430 and/or IOT device 410. In an embodiment, AP location database device 490 can be comprised in a core network associated with a network provider. In an embodiment, AP location database device 490 can be comprised in a network edge device, such as a RAN device. In an embodiment, AP location database device 490 can be comprised in a cloud environment, virtualization environment, etc.

In an aspect, AP location database device 490 can correlate location information from location determination device 432 with AP information 440, including emulated AP information, from IOT device 410, as reported by AP information receiving device 430. As an example, an IOT briefcase can transmit emulated Wi-Fi AP information that can be received by a tablet computer in the 'service area' of the IOT briefcase Wi-Fi emulation signal, which emulated AP information, e.g., AP information 440, can be received and reported to AP location database device 490 by the tablet computer along with location information for the tablet computer determined by a cell signal triangulation component of the tablet computer. In an embodiment, this reporting can occur without user intervention or initiation, e.g., occur in the background of the tablet computing environment, in a manner similar to, or the same as, reporting of a true AP by the tablet computer.

IOT device 410 can receive databased location information 460. IOT device 410 can query AP location database device 490 to initiate receiving database location information 460. Database location information 460 can comprise location information as reported to AP location database device 490 in AP information and location information 450, via a reporting device, e.g., AP information receiving device 430, or manipulations of location information reported to AP location database device 490, e.g., averages, distributions, calculated errors, etc. based on AP information and location information 450.

In an embodiment, system 400 enables IOT device 410 to determine its location without IOT device 410 comprising a conventional location determination component and without comprising a functional real AP component, allowing IOT device 410 advantages over other IOT devices that comprise one or both of a location component or real AP component, e.g., smaller, cheaper to manufacture, lower power draw, etc. System 400 facilitates use of existing UE reporting technology used to determine the location of real AP devices to enable determining the location of emulated AP devices, e.g., IOT device 410 with AP information emulator device 422 appears to UEs as a real AP device, even though it isn't, whereby the UE reports a UE location and sightings of IOT device 410 to AP location database device 490 that can then respond to a query by IOT device 410 by returning location information for the emulated AP information transmitted by IOT device 410 as AP information.

Figure 5:
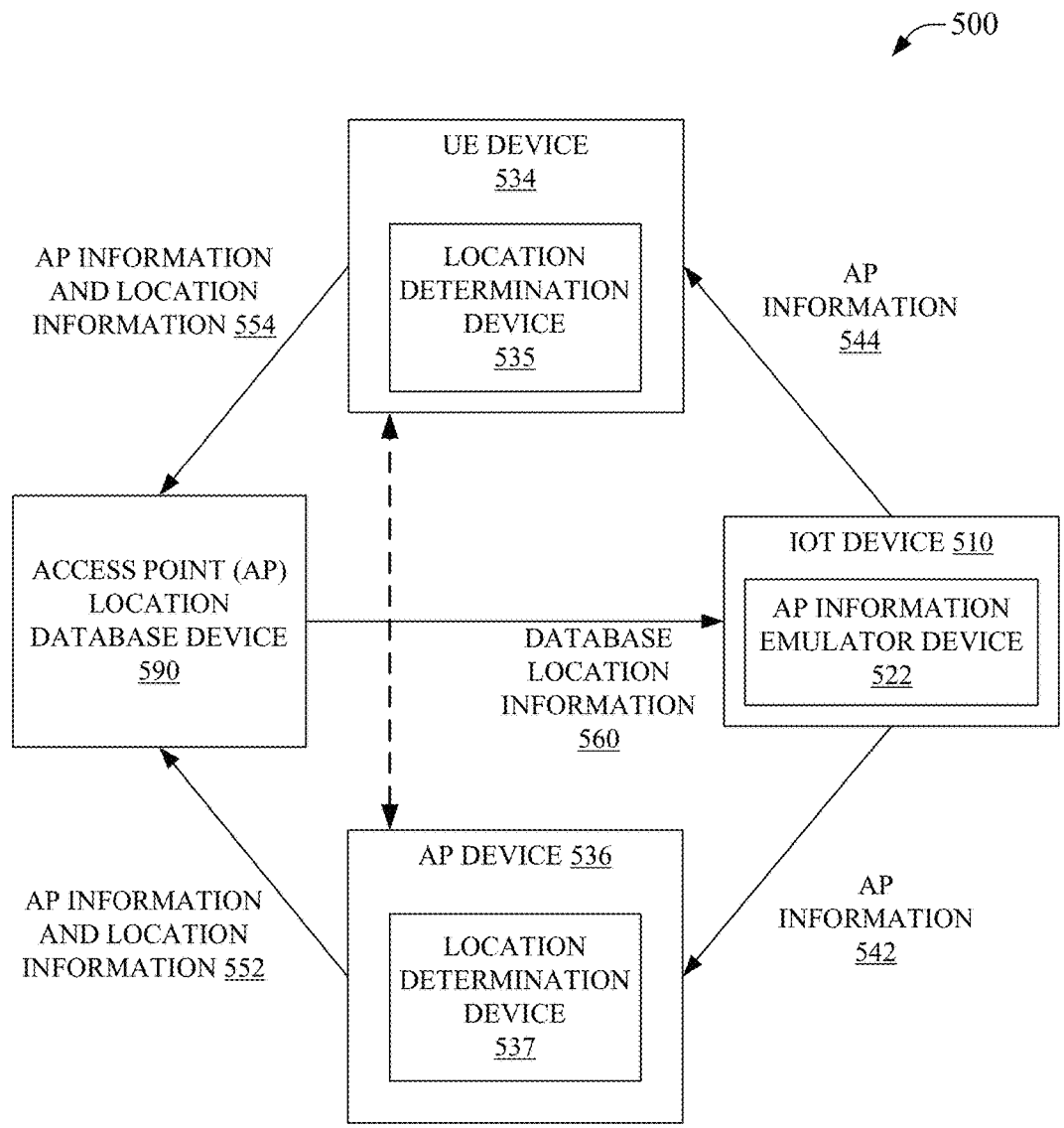
FIG. 5 illustrates an example system facilitating reporting, via a plurality of communication pathways, database location information to a first device based on location information of a second device that is correlated to access point information of the first device, in accordance with aspects of the subject disclosure.

FIG. 5 illustrates a system 500 that facilitates reporting, via a plurality of communication pathways, database location information to a first device based on location information of a second device that is correlated to access point information of the first device, in accordance with aspects of the subject disclosure. System 500 can comprise IOT device 510. IOT device 510 can comprise AP information emulator device 522. AP information emulator device can generate emulated AP information than can be transmitted to AP information receiving device 530 as AP information 540, 542, etc. In an embodiment, emulated AP information can be indistinguishable from true AP information. Emulated AP information can comprise a unique identifier allowing IOT device 510 to be uniquely identified among a plurality of other IOT devices.

AP information 542 can be received by AP device 536. AP information 544 can be received by UE device 534. In an embodiment, AP information 542 and 544 can be the same AP information transmitted by IOT device 510. In an embodiment, AP information 542 can be different from 544, such as by adapting AP information 542 for transmission specifically to an AP device and AP information 542 for transmission specifically to UEs. In an aspect, AP device 536 and UE device 534 can be AP information receiving devices, e.g., 130, 430, etc., that can transmit AP information 542, 544, etc., in accord with a particular RAT, such as a Wi-Fi standard, enabling IOT device 510 to be reported to AP location database device 590 by piggybacking on conventional Wi-Fi type UE reporting enjoyed by true APs.

In an aspect, AP information receiving device 530 can comprise location determination device 532. Location determination device 532 can determine, estimate, infer, etc., a location of AP information receiving device 530. As an example, UE device 534 can comprise a GPS component, e.g., location determination device 535, which can be employed to determine the location of the UE. As another example, AP device 536 can comprise a fixed location parameter set upon installation of the AP itself, e.g., location determination device 537 that can be employed to determine the location of the AP. UE device 534 can report AP information 544, including emulated AP information from AP information emulator device 522, and corresponding location information to AP location database device 590 as AP information and location information 554. AP device 536 can report AP information 542, including emulated AP information from AP information emulator device 522, and corresponding location information to AP location database device 590 as AP information and location information 552.

AP location database device 590 can typically be located remotely from an AP information receiving device, e.g., UE device 534, AP device 536, etc., and/or from IOT device 510. In an embodiment, AP location database device 590 can be comprised in a core network associated with a network provider. In an embodiment, AP location database device 590 can be comprised in a network edge device, such as a RAN device. In an embodiment, AP location database device 590 can be comprised in a cloud environment, virtualization environment, etc.

In an aspect, AP location database device 590 can correlate location information from location determination device(s) 535, 537, etc., with AP information 542, 544, etc., including emulated AP information from AP information emulator device 522, as reported in AP information and location information 552, 554, etc. In an embodiment, this reporting can occur without user intervention or initiation, e.g., occur in the background of an AP information receiving device(s), e.g., AP device 536, UE device 534, etc., computing environment, in a manner similar to, or the same as, reporting of a true AP by the AP information receiving device(s).

IOT device 510 can receive databased location information 560. IOT device 510 can query AP location database device 590 to initiate receiving database location information 560. Database location information 560 can comprise location information as reported to AP location database device 590 in AP information and location information 552, 554, etc., via an AP information receiving device(s), e.g., AP device 536, UE device 534, etc., or manipulations of location information reported to AP location database device 590, e.g., averages, distributions, calculated errors, etc. based on AP information and location information 552, 554, etc. In an embodiment, system 500 enables IOT device 510 to determine its location without IOT device 510 comprising a conventional location determination component and without comprising a functional real AP component, allowing IOT device 510 advantages over other IOT devices that comprise one or both of a location component or real AP component. System 500 facilitates use of existing UE reporting technology used to determine the location of real AP devices to enable determining the location of emulated AP devices, e.g., IOT device 510 with AP information emulator device 522 appears to UE device 534 and AP device 536 as a real AP device, even though it isn't, whereby they report a location and sightings of IOT device 510 to AP location database device 590 that can then respond to a query by IOT device 510 by returning location information for the emulated AP information transmitted by IOT device 510 as AP information 542, 544, etc.

System 500 further illustrates that different types of AP information receiving devices, e.g., UE 534, AP device 536, etc., can be employed, either alone or together, to report AP information 542, 544, etc. Moreover, the dashed line between UE 543 and AP device 536 illustrates a communicative link between the two devices. This communicative link can ray information between the devices, such that, AP information 544 to UE 534 can be sent to AP location database device 590 via AP device 536, e.g., AP information 544 and UE location from location determination device 535 can be routed via AP device 536 to AP location database device 590, either separately or as part of AP information and location information 552. Similarly, AP information 542 can be routed to AP location database device 590 via AP device 536 and UE device 534, e.g., separately or as part of AP information and location information 554.

Figure 6:
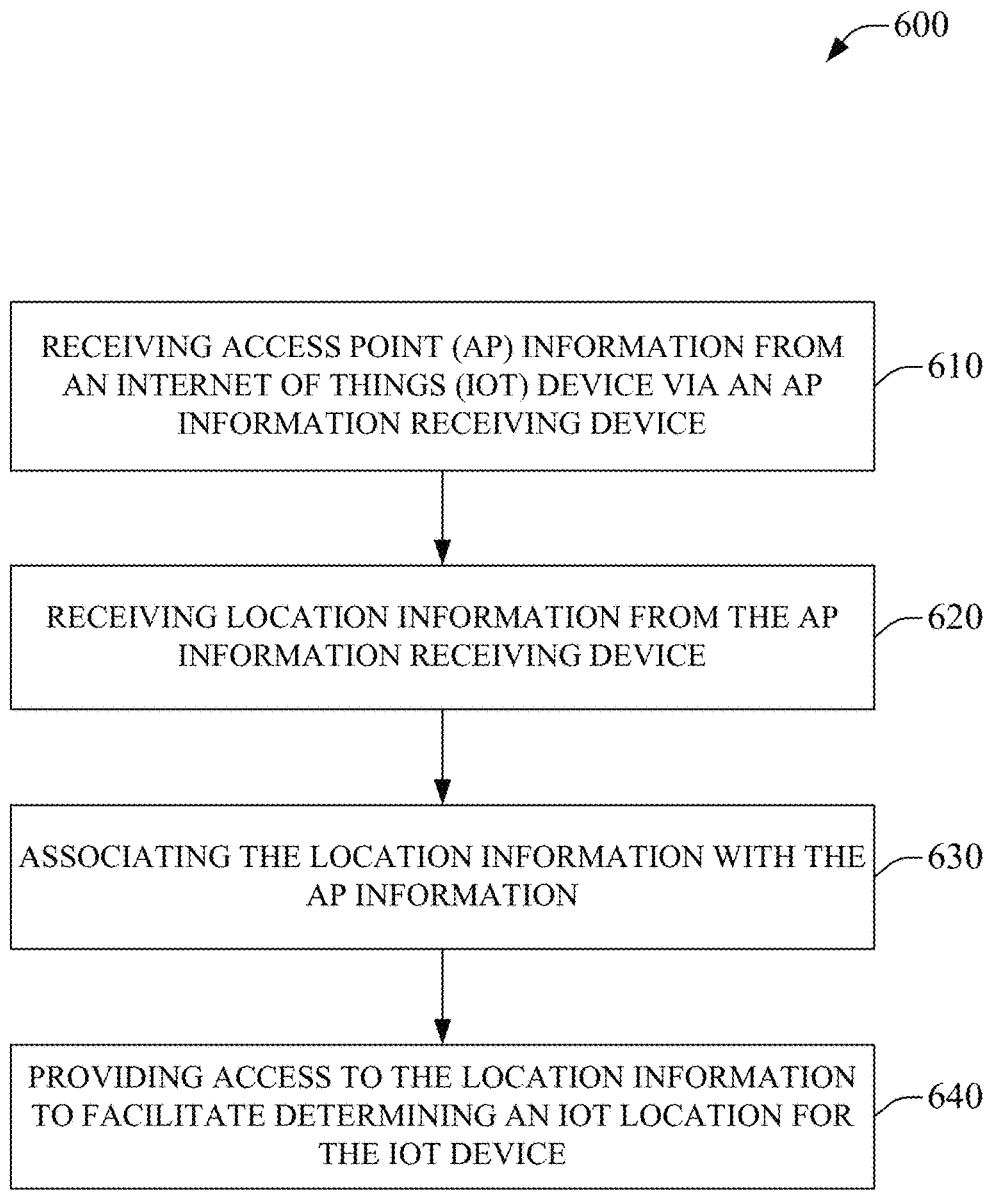
FIG. 6 illustrates an example method facilitating associating location information of a device receiving access point information from an internet of things device to facilitate determining a location of the internet of things device in accordance with aspects of the subject disclosure.
Figure 7:
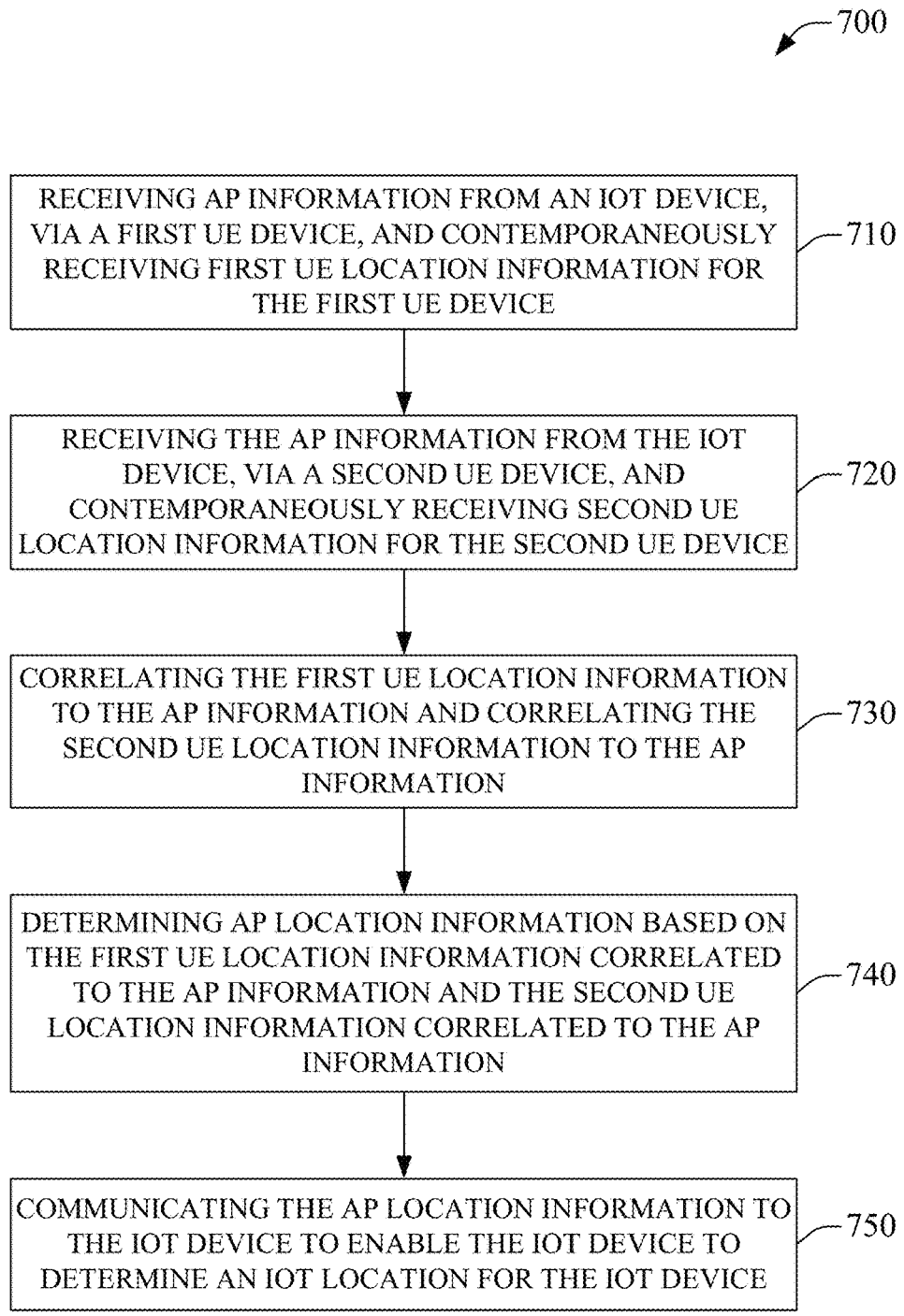
FIG. 7 depicts an example method facilitating determining a location of an internet of things device based on a plurality of locations reported by corresponding devices receiving access point information from the internet of things device in accordance with aspects of the subject disclosure.
Figure 8:
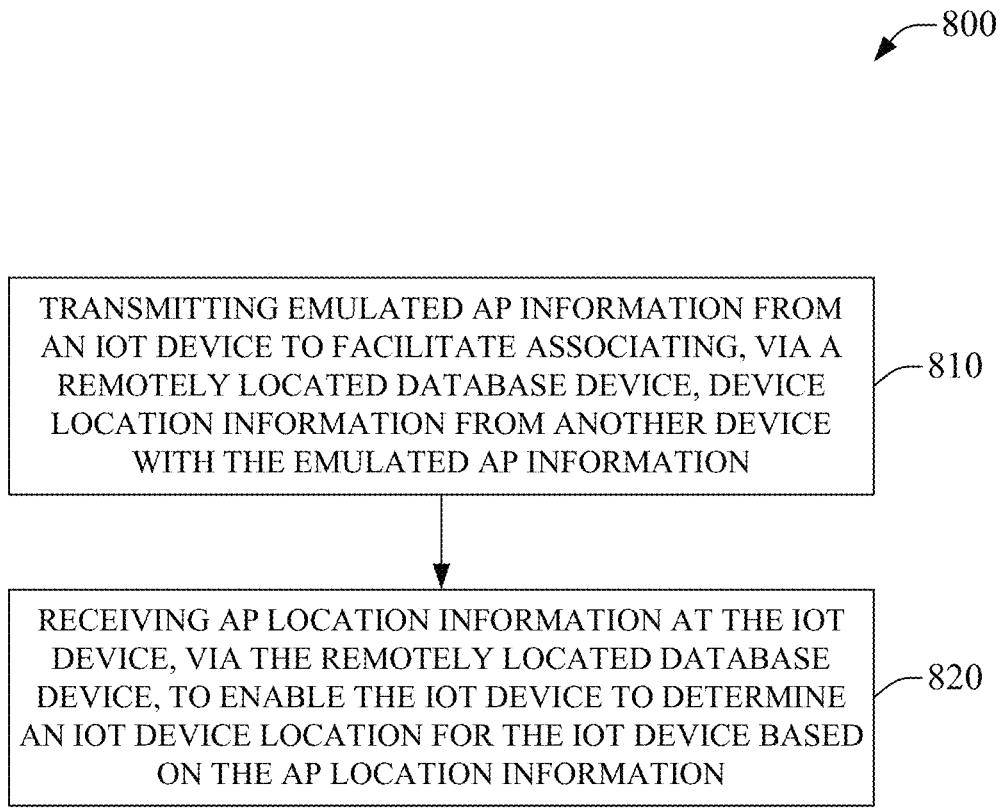
FIG. 8 illustrates an example method facilitating determining a location of an internet of things device via a database correlating a reported location of a user equipment with emulated access point information from an internet of things device in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600, facilitating associating location information of a device receiving access point information from an internet of things device to facilitate determining a location of the internet of things device in accordance with aspects of the subject disclosure. At 610, method 600 can comprise receiving AP information from an IOT device via an AP information receiving device. AP information can comprise a unique identifier for a device, e.g., the IOT device. The AP information receiving device can be a device other than the IOT device, e.g., a UE, AP, RAN device, etc.

At 620, method 600 can comprise receiving location information from the AP information receiving device. Location information can be determined for the AP information receiving device by nearly any location determination technology, e.g., GPS, triangulation, multilateration, time difference of arrival, physical measurement and recording, such as by a person, proximity to a known location, etc. In an embodiment, the AP information receiving device can be a GPS enabled UE that can relay, to another device, the location of the UE determined near in time to receiving the AP information, to facilitate correlating the location of the UE with the IOT device.

At 630, method 600 can comprise associating the location information with the AP information. In an aspect, the location information can represent a location of an AP information receiving device near in time to the AP information receiving device 'observing' the IOT device by receiving the AP information, which can comprise emulated AP information. As such, the location of the AP information receiving device can be used as an approximate location of the IOT device. Correlation of the AP information and the location information in a AP location database can facilitate communication of the location information for an indicated AP, for example, based on a unique identifier of an IOT device communicated in AP information, to a requesting device.

At 640, method 600 can comprise providing access to the location information to facilitate determining an IOT location for the IOT device. At this point method 600 can end. In an aspect, the IOT location can be a location of the IOT device determined from location information correlated to AP information from the IOT device. In an embodiment, the IOT device itself can receive the IOT location. This can enable an IOT device to self-locate by employing an existing technology typically employed to determine a location of a real AP. As such, an TOT device can self-locate without an internal GPS, or other conventional internal location determining technology. Moreover, where an AP information emulation is employed by the TOT device, a functional AP device need not be included in the TOT device. These aspects can allow the TOT device to typically be smaller, lighter, less power hungry, less expensive to manufacture, etc., as compared to TOT devices that comprise an internal location determining device, a fully functional AP device, or both.

In an embodiment, another device can receive the TOT location. This aspect can facilitate management of deployed TOT devices. As an example, a watch can be an TOT device that does not comprise a conventional internal location determining component such as an internal GPS. However, where the TOT watch generates emulated AP information, other devices, such as smartphones, tablet computers, vehicle computers, etc., can report their location in conjunction with observing the IOT watch emulated AP information. This information can then be employed by other devices, or the watch itself in some embodiments, to determine the location of the IOT watch. Continuing the example, where avoiding integration of a GPS component in the IOT watch allows the IOT watch to be priced lower and to be lighter and more compact than other location determining watches, e.g., smartwatches, that include a GPS locator, the IOT watch can be attractive to parents for placement on their children and can allow for locating the IOT watch by querying the AP location database. Typically the location accuracy is dependent on the RAT associated with the emulated AP information, e.g., the greater the coverage area of a RAT, the greater the area in which the IOT device could be. However, where multipole reporting device can report locations seeing the IOT device, the location data can be employed to improve location determinations for the IOT device, e.g., averaging, weighted averaging, Gaussian distributions, etc. As such, even where the location accuracy of the instant disclosure may be less accurate than other location technologies, it can be adequate for determining a location of IOT devices in many situations. The accuracy of the disclosed technology can be weighed against the other advantages of thereof in determining if the UE reporting of emulated AP information for location determination of the IOT device is appropriate.

FIG. 7 illustrates a method 700 that facilitates determining a location of an internet of things device based on a plurality of locations reported by corresponding devices receiving access point information from the internet of things device in accordance with aspects of the subject disclosure. At 710, method 700 can comprise receiving AP information for an IOT device via a first UE device. AP information can comprise a unique identifier for a device, e.g., the IOT device. The UE device can be a device other than the IOT device. Further, at 710, first UE location information for the first UE device can be received. The first UE location information can represent the location of the UE near in time, e.g., contemporaneous, with the UE observing the AP information from the IOT device. Location information can be determined for the UE device by nearly any location determination technology, e.g., a GPS enable UE. At 720, method 700 can comprise receiving the AP information for the IOT device via a second UE device and receiving contemporaneous second UE location information for the second UE device.

At 730, method 700 can comprise correlating the first UE location information, the second UE location information, and the AP information. In an aspect, the first and second UE location information can represent locations of the corresponding UE devices near in time to them receiving the AP information, which can comprise emulated AP information, from the IOT device. As such, the locations can be used to approximate a location of the IOT device. Correlation of the AP information and the first and second UE location information in an AP location database can facilitate communication of the location information for an indicated AP, for example, based on a unique identifier of an IOT device communicated in AP information, to a requesting device.

At 740, method 700 can comprise determine AP location information based on the correlation of the first UE location information, the second UE location information, and the AP information. In an example, where the first UE location and the second UE location are 60 feet apart and represent a same time, and the typical coverage area for the RAT associated with the emulated AP information is about a 30 foot radius, the location of the IOT device can be estimated to be directly between the location of the first and second UE with a relatively high confidence level because the IOT device is seen by both the first and second UE at the same time just as the two coverage areas begin to overlap. An increasing number of observing UEs can further be employed to improve location determination accuracy. Moreover, where the IOT device is stationary for a period, multiple UE observations within the period can be employed similarly. Other techniques for estimating a likely position based on the location information, timing, and AP information can also be applied at 740. In an embodiment, raw UE location data can be stored as AP location data. In an embodiment, location information determined from raw UE location information can be stored as AP location information. In an embodiment, both raw UE location data and location data determined form raw UE location data can be stored as AP location data.

At 750, method 700 can comprise communicating the AP location information to the IOT device to enable the IOT device to determine an IOT location for the IOT device. In an embodiment, though not detailed here for the sake of clarity and brevity, the AP location information can be communicated to other devices. At this point method 700 can end. In an aspect, the AP location information can indicate a location of the IOT device determined from a plurality of location information correlated to AP information from an IOT device. In an embodiment, the IOT device itself can receive the IOT location. This can enable an IOT device to self-locate by employing an existing technology typically employed to determine a location of a real AP. As such, an IOT device can self-locate without an internal GPS, or other conventional internal location determining technology. Moreover, where an AP information emulation is employed by the TOT device, a functional AP device need not be included in the TOT device. These aspects can allow the TOT device to typically be smaller, lighter, less power hungry, less expensive to manufacture, etc., as compared to TOT devices that comprise an internal location determining device, a fully functional AP device, or both. In an embodiment, another device can receive the TOT location.

FIG. 8 illustrates a method 800 that facilitates determining a location of an internet of things device via a database correlating a reported location of a user equipment with emulated access point information from an internet of things device in accordance with aspects of the subject disclosure. At 810, method 800 can comprise transmitting emulated AP information form an TOT device. The emulated AP information can be associated with location information from another device. As such, the transmittal of emulated AP information at 810, by the TOT device, can facilitate the associating, via a remotely located database device, the emulated AP information from the TOT device and the location information from another device.

At 820, method 800 can comprise receiving, at eh TOT device, AP location information to enable the TOT device to determine an TOT device location for the TOT device based on the AP location information. The receiving, at the TOT device, of the AP location information can be from, for example, an AP location database. At this point method 800 can end. In an embodiment, a the TOT device can transmit emulated AP information. The TOT device can then receive AP location information that can be used to determine a location of the TOT device, e.g., the TOT device location. The AP location information can be based on location data for other devices that observed the transmission of the emulated AP information from the IOT device. The AP location information can be received by the IOT device from an AP location database device associated with the collection, correlation, and manipulation of emulated AP information as observed by other devices after transmission from the IOT device.

Figure 9:
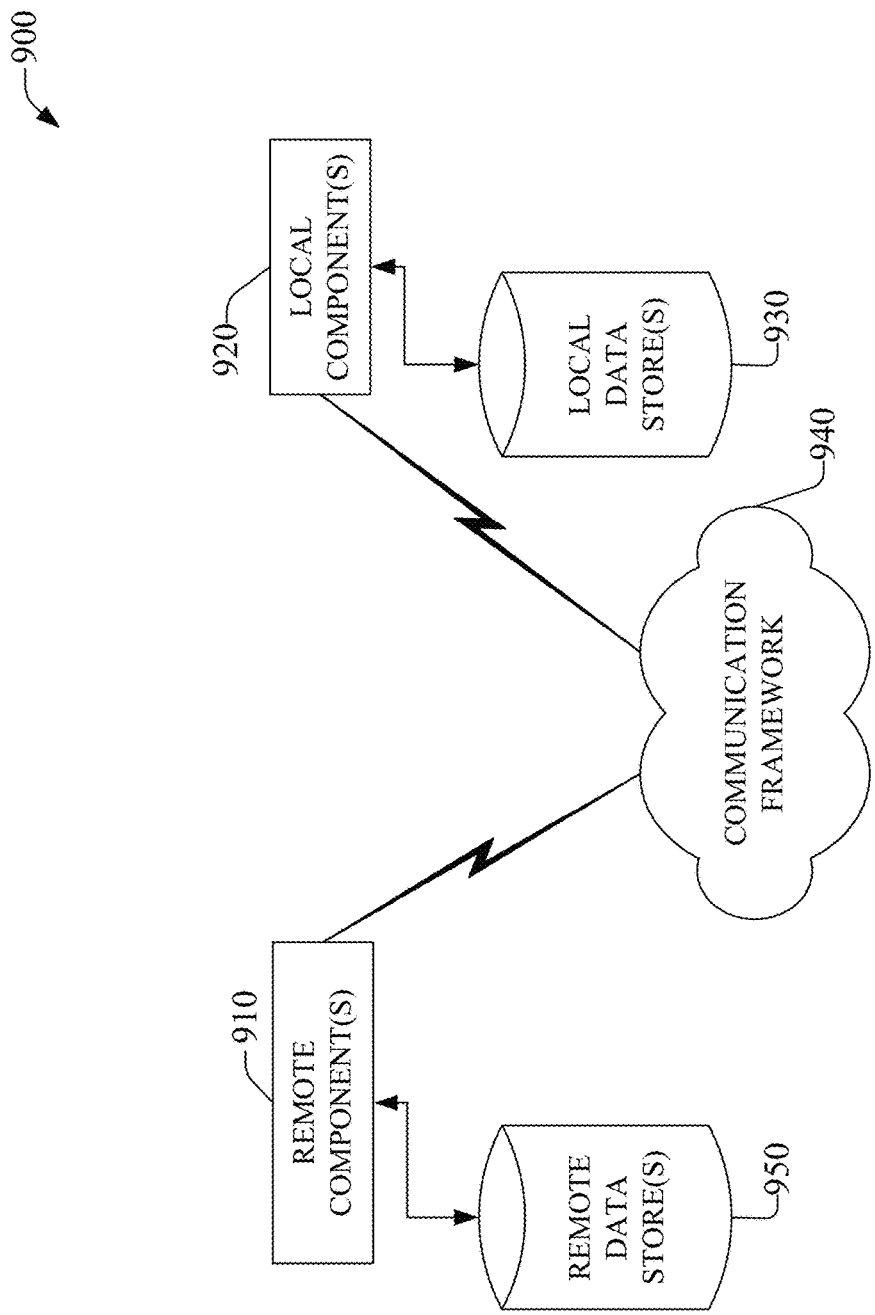
FIG. 9 depicts an example schematic block diagram of a computing environment with which the disclosed subject matter can interact.

FIG. 9 is a schematic block diagram of a computing environment 900 with which the disclosed subject matter can interact. The system 900 includes one or more remote component(s) 910. The remote component(s) 910 can be hardware and/or software (e.g., threads, processes, computing devices). In some embodiments, remote component(s) 910 can include servers, personal servers, wireless telecommunication network devices, etc. As an example, remote component(s) 910 can be AP location database device 190, 290, 490, 590, etc., AP information receiving device 130, 430, etc., UE device 534, etc., AP device 536, etc., or other remotely located components.

The system 900 also includes one or more local component(s) 920. The local component(s) 920 can be hardware and/or software (e.g., threads, processes, computing devices). In some embodiments, local component(s) 920 can include, for example, IOT device 110, 210, 310, 410, 510, etc., other device 292, etc., AP information receiving device 130, 430, etc., UE device 534, etc., AP device 536, etc., or other locally located components.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as a hard drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
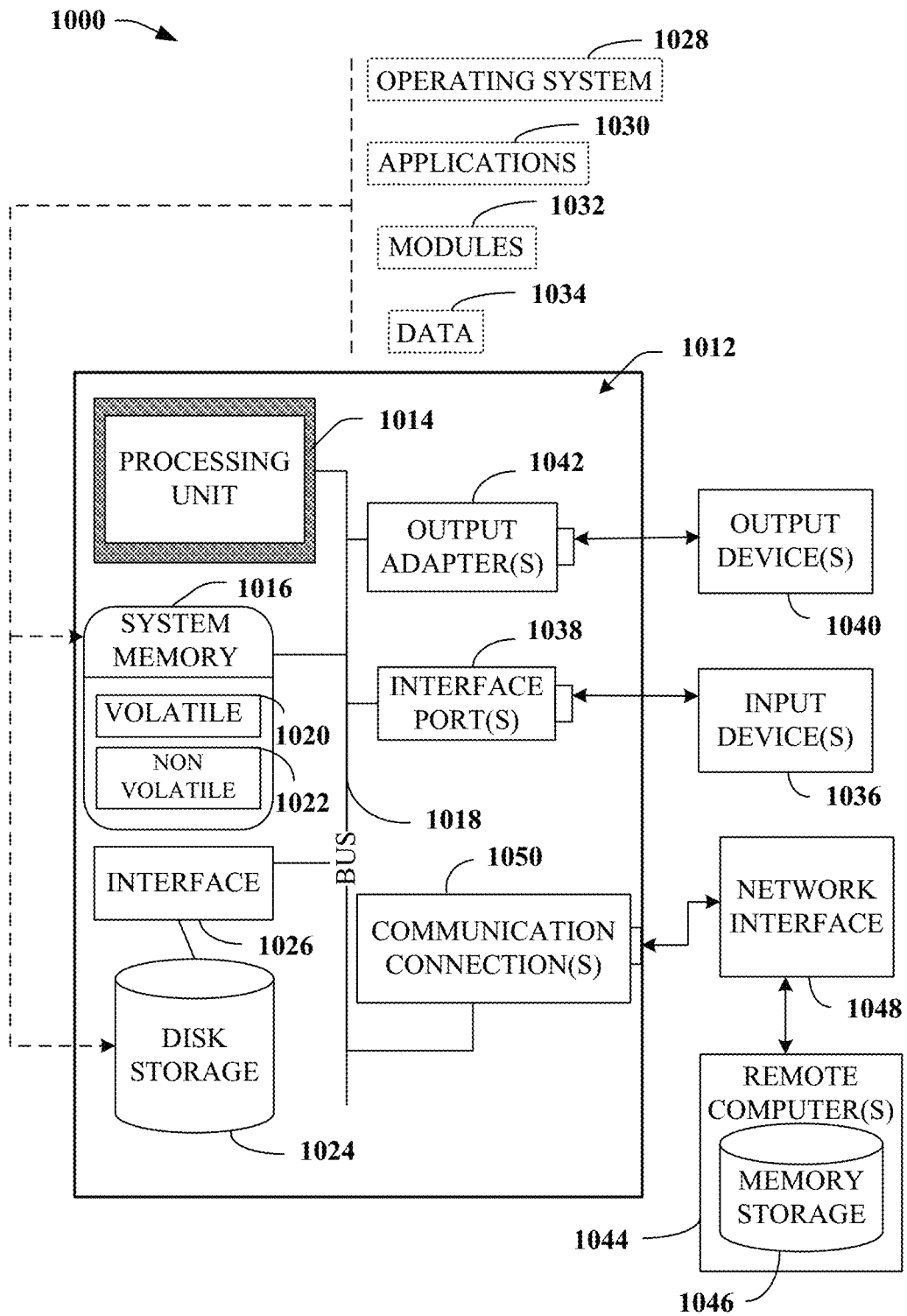
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of AP location database device 190, 290, 490, 590, etc., AP information receiving device 130, 430, etc., UE device 534, etc., AP device 536, etc., IOT device 110, 210, 310, 410, 510, etc., other device 292, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: transmitting emulated AP information as AP information, e.g., AP information 140, 340, 440, 542, 544, etc., and receiving database location information, e.g., 260, 460, 560, etc., to facilitate determining a location of an IOT device.

Communications media typically embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a user interface can allow entry of user preference information, etc., and can be embodied in a touch sensitive display panel, a mouse input GUI, a command line controlled interface, etc., allowing a user to interact with computer 1012. As an example, UI Component 584 can receive touch, motion, audio, visual, or other types of input. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044. As an example, user input can be captured in relation to performing analysis on correlated UE location information and AP information at an AP location database device, e.g., AP location database device 190, 290, 490, 590, etc., in accordance with the presently disclosed subject matter.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
 a processor; and
 a memory that stores executable instructions that, when executed by the processor, facilitate performance of operations, comprising:
  broadcasting emulated data resulting in broadcast emulated data, wherein the emulated data emulates access point data broadcast by an access point device such that the device appears to be the access point device, wherein the emulated data comprises a unique identifier associated with the device, wherein the emulated data is correlated to observing device location data, via a data storage device, and wherein the observing device location data is determined by an observing device in response to the observing device receiving the broadcast emulated data;

receiving location data from the data storage device, wherein the location data is based on the observing device location data as correlated to the emulated data; and determining a device location of the device based on the location data.

2. The system of claim 1, wherein the observing device is a user equipment.

3. The system of claim 2, wherein the user equipment is a mobile device.

4. The system of claim 1, wherein the observing device is an access point device.

5. The system of claim 1, wherein the observing device location data is determined by the observing device via a global positioning system device.

6. The system of claim 1, wherein the access point device is a Wi-Fi access point device that implements a Wi-Fi protocol, wherein the emulated data emulates Wi-Fi access point data in order for the observing device to accept the broadcast emulated data as the Wi-Fi access point data, and wherein the Wi-Fi protocol is based on an Institute of Electrical and Electronics Engineers' (IEEE) 802.11 standard.

7. The system of claim 1, wherein the emulated data is generated by an access point device, and wherein an adaptation of the device prevents a connection between the observing device and a network via the access point device.

8. The system of claim 1, wherein the emulated data is generated by an access point emulator device.

9. The system of claim 8, wherein the access point emulator device does not comprise the access point device.

10. The system of claim 8, wherein the access point emulator device comprises an application specific integrated circuit device.

11. The system of claim 8, wherein the access point emulator device comprises a field programmable logic array device.

12. A method, comprising:
obtaining, by a storage device comprising a processor, emulated access point information via a receiving device, wherein the emulated access point information was transmitted to the receiving device by a first device emulating an access point device;

obtaining, by the storage device, receiving device location information corresponding to a first location of the receiving device when the receiving device received the emulated access point information transmitted by the first device;

correlating, by the storage device, the receiving device location information to the emulated access point information; and in response to a query received by the storage device, enabling, by the storage device, access to the receiving device location information as correlated to the emulated access point information to facilitate determining a second location of the first device based on the receiving device location information.

13. The method of claim 12, wherein the receiving device is a mobile device.

14. The method of claim 12, wherein the first device emulates the access point device by emulating implementation of a Wi-Fi protocol, and wherein the Wi-Fi protocol is based on an Institute of Electrical and Electronics Engineers' (IEEE) 802.11 standard.

15. The method of claim 14, wherein the first device does not comprise a chipset that enables communication between the receiving device and a network device of a network via a Wi-Fi protocol.

16. The method of claim 14, wherein the first device comprises a chipset that implements a Wi-Fi protocol, and wherein an adaptation of the first device prevents access to network devices of a network via the Wi-Fi protocol.

17. A network device, comprising:
a processor; and
a memory that stores executable instructions that, when executed by the processor, facilitate performance of operations, comprising:
receiving a unique identifier via a user equipment device, wherein the unique identifier has been transmitted to the user equipment device by a first device emulating an access point device;

receiving user equipment location information corresponding to a first location of the user equipment device at a time that the user equipment device received the unique identifier that was transmitted by the first device;

storing location information correlated to the unique identifier and determined from the user equipment location information; and in response to receiving a query based on the unique identifier, enabling access to the location information to facilitate determining a second location of the first device based on the location information.

18. The network device of claim 17, wherein the receiving the query comprises receiving the query from the first device.

19. The network device of claim 17, wherein the receiving the query comprises receiving the query from a second device different from the first device.

20. The network device of claim 17, wherein the first device emulating the access point device is the first device emulating a Wi-Fi access point device implementing a Wi-Fi protocol, and results in the first device appearing as the Wi-Fi access point device to the user equipment device despite the first device not being able to perform as the Wi-Fi access point device, and wherein the Wi-Fi protocol is a protocol based on an Institute of Electrical and Electronics Engineers' (IEEE) 802.11 standard.

* * * * *